United States Patent [19]

Terada

[11] Patent Number: 5,357,238

[45] Date of Patent: Oct. 18, 1994

[54] WHEEL MARKER FOR VEHICLE INCLUDING SOLAR CELL

[75] Inventor: Toshiyuki Terada, Tokyo, Japan

[73] Assignee: Stanley Electric Co., Ltd., Tokyo, Japan

[21] Appl. No.: 929,174

[22] Filed: Aug. 11, 1992

[30] Foreign Application Priority Data

Aug. 20, 1991 [JP] Japan ................. 3-072994

[51] Int. Cl.⁵ .............................. B60Q 1/00
[52] U.S. Cl. ................... 340/425.5; 362/78; 362/191; 362/252; 362/800
[58] Field of Search ............. 340/425.5; 362/78, 191, 362/800, 252, 72, 249

[56] References Cited

U.S. PATENT DOCUMENTS

| | | | |
|---|---|---|---|
| 3,675,199 | 7/1972 | Jamison et al. | 340/425.5 |
| 4,430,692 | 2/1984 | Papadakis | 362/78 |
| 4,562,516 | 12/1985 | Chastian | 362/78 |
| 4,775,919 | 10/1988 | Pearsall et al. | 362/78 |
| 4,800,469 | 1/1989 | Leon | 362/78 |
| 4,881,153 | 11/1989 | Scott | 362/78 |
| 5,074,706 | 12/1991 | Paulos | 340/435 |

Primary Examiner—John K. Peng
Assistant Examiner—Nina Tong
Attorney, Agent, or Firm—Louis Weinstein

[57] ABSTRACT

A wheel marker including a solar cell and disposed on a wheel cap so as to allow the present rotating state of a wheel of a vehicle to be visually recognized from a remote location includes as essential components a light emitting section radially extending toward the center of the wheel cap, a solar cell electricity generating section circumferentially extending around the central part of the wheel cap, a brightness detecting sensor disposed at the center of the wheel cap on the front side, an inverter disposed on the rear side, and a battery disposed on the rear side of the wheel cap and adapted to be charged by the solar cell. The light emitting section includes a light emitting element which usually comprises an electroluminescence element or a light emitting diode. In response to an output from the brightness detecting photosensor, the inverter is activated to turn on or off the battery. To turn off the battery when there is no need of activating the light emitting section, e.g., in the daytime, a power switch is disposed in position on the front surface of the wheel cap.

15 Claims, 1 Drawing Sheet

WHEEL MARKER FOR VEHICLE INCLUDING SOLAR CELL

BACKGROUND OF THE INVENTION

1. Field of the Invention

The present invention relates generally to a wheel marker for a vehicle including a solar cell and disposed on a wheel cap to be mounted on a wheel of the vehicle. More particularly, the present invention relates to a wheel marker of the foregoing type which assures that the present rotating state of wheels can visually be recognized from a remote location especially in the nighttime.

2. Description of the Prior Art

A wheel cap made of a metallic material or molded of a synthetic resin is hitherto mounted on each wheel of a vehicle in order to improve exterior design of the wheel and reduce air resistance against rotation of wheels.

In the prior art, however, since no illuminating unit is disposed on the wheel, the position of the wheel can not visually be recognized especially in the nighttime. In addition, the present rotating state of the wheel can not be detected or monitored at all in the nighttime.

SUMMARY OF THE INVENTION

The present invention has been made with the foregoing background in mind.

An object of the present invention is to provide a wheel marker for a vehicle including a solar cell and disposed on a wheel cap to be mounted on a wheel of the vehicle wherein not only the present rotating state of the wheel but also the position of the same can visually be recognized from a remote location especially in the nighttime.

According to the present invention, there is provided a wheel marker for a vehicle including a solar cell and disposed on a wheel cap to be mounted on a wheel of the vehicle, wherein the wheel marker comprises a light emitting section radially extending toward the center of the wheel cap, the light emitting section including a light emitting element; a solar cell electricity generating section arranged around the substantially central part of the wheel cap on the front side (i.e. exposed outer surface) of the same to receive sunshine in the daytime, the solar cell electricity generating section including a solar cell; a brightness detecting photosensor disposed at the center of the wheel cap, the brightness detecting photosensor being located on the front side of the wheel cap; an inverter having a brightness output processing circuit and a light emitting element activating circuit incorporated therein, the inverter being located on the rear side (i.e. inner surface) of the wheel cap; and a battery serving as a power source, the battery being located on the rear side of the wheel cap.

The light emitting element and the brightness detecting photosensor are electrically connected to the inverter via lead wires, while the battery is electrically connected to the same via a lead wire. In addition, the solar cell is electrically connected via a lead wire to the battery which in turn is electrically connected to the inverter via a lead wire.

In response to an output from the brightness detecting photosensor, the inverter is activated to turn on or off the battery.

Usually, an electroluminescence element is employed for the light emitting element. Alternatively, a light emitting diode may be employed.

The light emitting section is fitted to a radially extending slit-shaped opening portion which is punched through a part of the wheel cap. On the other hand, the solar cell electricity generating section is fitted to a circumferentially extending opening portion which is punched through the wheel cap around the central part of the wheel cap.

To turn off the battery when there is no need of activating the light emitting section, e.g., in the daytime, a power switch is disposed in position on the front surface of the wheel cap. To this end, the power switch is electrically connected to the inverter via a lead wire.

Other objects, feature and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENT

Figure 1:
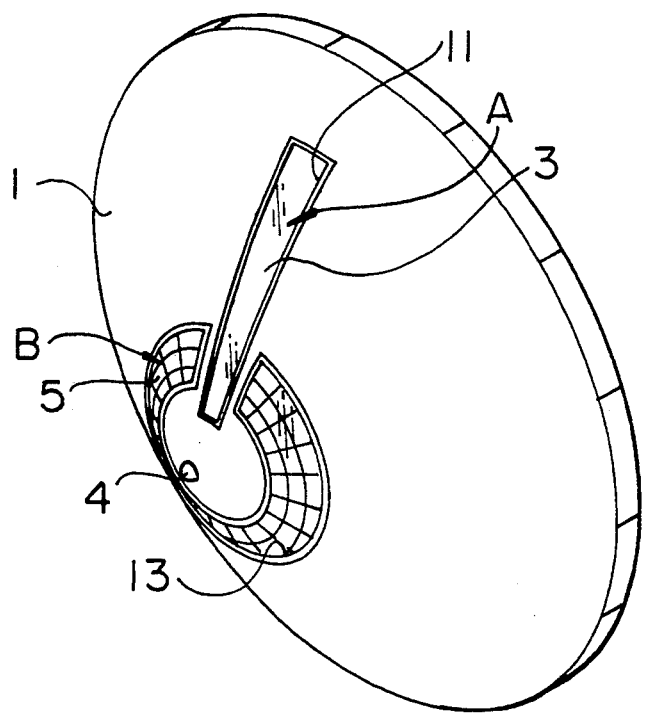
FIG. 1 is a perspective view of a wheel cap to be mounted on a wheel, particularly illustrating arrangement of a wheel marker for a vehicle including a solar cell in accordance with an embodiment of the present invention.

Now, the present invention will be described in detail hereinafter with reference to FIG. 1 and FIG. 2 which illustrates a wheel marker for a vehicle including a solar cell in accordance with an embodiment of the present invention.

The wheel marker to be mounted on a wheel cap 1 includes a light emitting section A and a solar cell electricity generating unit B.

A slit-shaped opening portion 11 radially extending toward the center of the wheel cap 1 is punched through a part of the wheel cap 1 so as to receive the light emitting section A.

A transparent protective cover 2 is fitted to the opening portion 11, and a light emitting element 3 comprising an electroluminescence element or the like is firmly held inside of the protective cover 2 with the aid of a holder 12 disposed on the rear side of the wheel cap 1.

In the shown embodiment, the opening portion 11 is designed to have an arbitrary width along the slit-shaped contour of the light emitting section. However, the contour of the opening portion 11 should not be limited to this slit-shaped one. Alternatively, another contour my be employed for the opening portion 11, provided that it is proven that it is practically usable therefor without any particular problem. It is recommendable from the viewpoint of electricity saving and workability that the opening portion 11 is designed to have a possibly small surface area.

In addition to the electroluminescence element, a light emitting diode, a bulb or the like are employable for the light emitting element 3.

Another opening portion 13 is punched through the wheel cap 1 around the central part of the wheel cap 1 so as to allow a transparent protective cover 2a to be fitted to the opening portion 13, and moreover, the solar cell electricity generation section B including a solar cell 5 is firmly held on the rear side of the wheel cap 1 with the aid of the holder 12. As is apparent from FIG. 2, the solar cell 5 is protected from damage or injury by the transparent protective cover 2. As shown in FIG. 1, solar cell 5 has an annular shape, but does not extend completely around the annulus. Thus, the solar cell 5 is not completely continuous, but has a discontinuity so as to have spaced ends. The light emitting section A extends into a region of the discontinuity between the ends of the solar cell 5.

Figure 2:
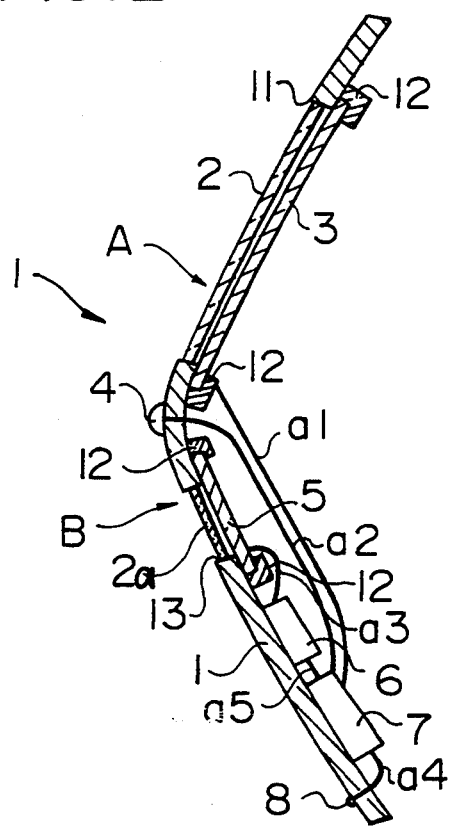
FIG. 2 is a fragmentary sectional view of the wheel cap, particularly illustrating essential components constituting the wheel marker shown in FIG. 1.

The opening portion 13 is punched to exhibit the circumferentially extending contour as shown in FIG. 1. However, the contour of the opening portion 13 should not be limited to the shape as shown. Another contour may be employed for the opening portion 13, provided that it is proven that it is practically usable for it without any particular problem.

To detect the present brightness of the surrounding environment through which a vehicle is running, a photosensor 4 is disposed at the center of the wheel cap 1 on the front side of the same.

An inverter 7 having a brightness output processing circuit and a light generating element activating circuit incorporated therein as well as a battery 6 chargeable with electricity generated by the solar cell 5 are immovably held on the rear side of the wheel cap 1 with the aid of screws (not shown).

The inverter 7 is electrically connected to the light emitting element 3 via a lead wire a1, while the inverter 7 is electrically connected to the photosensor 4 via a lead wire a2. In addition, the battery 6 is electrically connected to the solar cell 5 via a lead wire a3, while the battery 6 is electrically connected to the inverter 7 via a lead wire a5 so as to allow it to be charged with the electricity generated by the solar cell 5 in the daytime.

A power switch 8 is disposed in position on the outer surface of the wheel cap 1 in order to turn off a power supply system for the wheel marker when there is no need of activating the light emitting section A, e.g., in the daytime. The power switch 8 is electrically connected to the inverter 7 via a lead wire a4.

As described above, since the wheel marker is constructed in the above-described manner, the wheel can visually be recognized as if it is substantially wholly illuminated by the light emitting section disposed on the wheel cap during rotation of tires (wheels) at a high speed. On the contrary, when the tires (wheels) rotate at a low speed, the light emitting section is visually recognized as if a band-shaped illuminated pattern rotates around the tire on which the wheel marker is disposed. In other words, the wheel marker creates an illuminating state corresponding to the rotating state of the tires (wheels).

Since the inverter and the battery are arranged on the rear side of the wheel cap and they are previously electrically connected to each other via lead wires, a user is not required to perform any special wiring operation when a wheel cap is mounted on a wheel. Thus, the wheel marker can be mounted merely by mounting the wheel cap on the tire. When it is required that the wheel marker is repaired, it can easily be disconnected from the tire.

In addition, since the battery is normally charged with the electricity generated by the solar cell in the daytime, there is no need of exchanging the battery with another one. Consequently, the wheel marker can practically be used for a long time.

While the present invention has been described above with respect to a single preferred embodiment thereof, it should of course be understood that the present invention should not be limited only to this embodiment but various changes or modifications may be made without departure from the scope of the present invention as defined by the appended claims.

What is claimed is:

1. A wheel marker for a vehicle including a solar cell and disposed on a wheel cap to be mounted on a wheel of a vehicle, comprising:

said wheel cap having an exposed outer surface and an inner surface facing said wheel, a light emitting section radially extending toward a center of said wheel cap, a solar cell electricity generating section arranged around the central part of said wheel cap on the inner surface and including an opening in the wheel cap to receive sunshine in the day time, said solar cell electricity generating section including a solar cell, a brightness detecting photosensor disposed at the center of said wheel cap, said brightness detecting photosensor being located on the outer surface of said wheel cap, an inverter located on the inner surface of said wheel cap, and a battery serving as a power source for said light emitting section, photosensor and inverter, said battery being located on the inner surface of said wheel cap and being charged by said solar cell, said light emitting section, photosensor, inverter and battery being electrically connected together so as to cause the light emitting section to change its light output with changes in the light detected by the photosensor.

2. The wheel marker according to claim 1, wherein said light emitting section is electrically connected to said inverter via lead wires, while said battery is electrically connected to said inverter via a lead wire.

3. The wheel marker according to claim 1, wherein said solar cell is electrically connected via a lead wire to said battery which in turn is electrically connected to said inverter via a lead wire.

4. The wheel marker according to claim 1, wherein in response to an output from said brightness detecting photosensor, said inverter is activated to turn on or off said battery.

5. The wheel marker according to claim 1, wherein said light emitting section comprises an electro-luminescence element.

6. The wheel marker according to claim 1, wherein said light emitting section comprises a light emitting diode.

7. The wheel marker according to claim 1, wherein said light emitting section is fitted to a radially extending slit-shaped opening portion which is punched through a part of said wheel cap.

8. The wheel marker according to claim 1, wherein said solar cell section is fitted to a circumferentially extending opening portion which is punched through said wheel cap around a central part thereof.

9. The wheel marker according to claim 1 further including a power switch disposed in position on the outer surface of said wheel cap to turn off said battery when there is no need of activating said light emitting section, said power switch being electrically connected to said inverter via a lead wire.

10. The wheel marker according to claim 1, wherein protective transparent covers are provided to protect said light emitting section and said solar cell.

11. The wheel marker according to claim 1, wherein said light emitting section is displaced from the center of said wheel cap.

12. The wheel marker according to claim 1, wherein said wheel cap is removably mounted on said wheel.

13. The wheel marker according to claim 1, wherein said solar cell has an annular shape.

14. The wheel marker according to claim 1, wherein said annular shape solar cell has a discontinuity.

15. The wheel marker according to claim 14, wherein the opening provided for said light emitting section extends into a region of said discontinuity.

* * * * *